(12) United States Patent
Järvenpää

(10) Patent No.: US 9,591,293 B2
(45) Date of Patent: Mar. 7, 2017

(54) STEREOSCOPIC FIELD SEQUENTIAL COLOUR DISPLAY CONTROL

(75) Inventor: Toni Johan Järvenpää, Toijala (FI)

(73) Assignee: Nokia Technologies Oy, Espoo (FI)

( * ) Notice: Subject to any disclaimer, the term of this patent is extended or adjusted under 35 U.S.C. 154(b) by 880 days.

(21) Appl. No.: 13/055,654

(22) PCT Filed: Jul. 22, 2008

(86) PCT No.: PCT/EP2008/059589
§ 371 (c)(1),
(2), (4) Date: Apr. 14, 2011

(87) PCT Pub. No.: WO2010/009758
PCT Pub. Date: Jan. 28, 2010

(65) Prior Publication Data
US 2011/0298894 A1    Dec. 8, 2011

(51) Int. Cl.
*H04N 13/04* (2006.01)

(52) U.S. Cl.
CPC .............. *H04N 13/0422* (2013.01)

(58) Field of Classification Search
CPC .............. H04N 13/04; H04N 13/0422; H04N 13/0438; H04N 13/0486
See application file for complete search history.

(56) References Cited

U.S. PATENT DOCUMENTS

| | | | |
|---|---|---|---|
| 4,692,792 A | 9/1987 | Street | 358/3 |
| 4,995,718 A | 2/1991 | Jachimowicz et al. | 353/31 |
| 5,428,366 A * | 6/1995 | Eichenlaub | G02B 27/0093 |
| | | | 345/102 |
| 5,760,827 A * | 6/1998 | Faris | 348/42 |
| 5,879,065 A | 3/1999 | Shirochi et al. | 353/8 |
| 6,831,624 B1 * | 12/2004 | Harrold | 345/98 |
| 7,567,271 B2 * | 7/2009 | Berestov | 348/48 |
| 8,179,362 B2 * | 5/2012 | Brigham et al. | 345/102 |
| 2002/0008712 A1 * | 1/2002 | Shigeta | H04N 9/3114 |
| | | | 345/690 |
| 2007/0176943 A1 * | 8/2007 | Cho | G09G 3/3413 |
| | | | 345/589 |
| 2007/0188711 A1 * | 8/2007 | Sharp et al. | 353/8 |
| 2008/0259099 A1 * | 10/2008 | Arai | G09G 5/10 |
| | | | 345/690 |

FOREIGN PATENT DOCUMENTS

| | | |
|---|---|---|
| WO | WO 94/16353 A | 7/1994 |
| WO | WO 2005/039192 A | 4/2005 |
| WO | WO 2005/099279 A | 10/2005 |

\* cited by examiner

Primary Examiner — Christopher Findley
(74) Attorney, Agent, or Firm — Harrington & Smith

(57) ABSTRACT

The present invention relates to a method, an apparatus, a method and a computer program suitable for controlling a stereoscopic field sequential color display to provide a first primary color component image for a user's first eye and a second primary color component image for the user's second eye, wherein the first and the second primary color component images are both provided either at least partially overlapping in time or alternately in uninterrupted succession and wherein the primary color components of the first and second primary color component images are different from each other.

17 Claims, 5 Drawing Sheets

STEREOSCOPIC FIELD SEQUENTIAL COLOUR DISPLAY CONTROL

RELATED APPLICATION

This application was originally filed as PCT Application No. PCT/EP2008/059589 filed on Jul. 22, 2008, which is incorporated herein by reference in its entirety.

FIELD

This invention relates to the control of stereoscopic field sequential colour displays.

BACKGROUND

Displays are used in a variety of applications. They serve for providing images, i.e. visual information, to a user. The quality of these images is a key issue for the user, i.e. the viewer or observer. Image quality flaws, for instance image noise, blurring, flicker, lack of spatial resolution or unnatural colours, deteriorate the performance. This is not only a problem affecting the user's convenience, which is of course exceedingly important as a selling point, but also constricts the scenarios of use of a display.

For example, a display employed in the field of medical technology providing only poor image quality may be a cause of severe harm to a patient if either still image content or video content is not reproduced authentically.

When developing display technologies, characteristics of human visual perception have to be considered.

In principle, light entering the eye is projected onto the retina. The retina comprises different types of cells, namely cone-cells and rod-cells. These cells convert light into neural signals that are transmitted to the brain via the optic nerve. There, the neural signals are processed to create an image.

Rod-cells are much more light-sensitive than cone-cells. They allow for visual perception even in dark surroundings. Cone-cells are less light sensitive and are responsible for colour perception. Colour is an important characteristic of visual information.

The human eye is provided with three different types of cones, each having its peak of light-sensitivity at a different wavelength. In particular, a first type of cones is sensitive to blue light, a second type is sensitive to green light and a third type is sensitive to red light. The brain merges the neural signals of all three types of cones to create a full colour image. Thus, humans possess three independent channels for perceiving colour information. Human vision is therefore called trichromatic.

Human visual perception is highly developed. It allows for the discrimination of a huge variety of colours. On the other hand, human visual perception is subject to a plurality of limitations.

For example, the temporal resolution of human visual perception is limited. However, this limitation can be used to achieve a technical benefit. Generating moving pictures is based on this principle. Individual still images acquired one after another with a small temporal displacement are displayed in rapid succession. If the temporal displacement is sufficiently small, i.e. the number of still images acquired in a period of time is sufficiently high, and the speed at which these images are reproduced is chosen accordingly, a viewer gains the impression that he does not watch a discrete set of images, but continuous video content. Thus, recording and reproduction of moving objects with satisfying quality becomes possible by taking advantage of a limitation of the human visual system.

Another limitation of human visual perception concerns the ability to distinguish visual information that stems from objects that are arranged in spatial proximity.

Again, this perceptional shortcoming can be taken advantage of. Colour reproduction in thin film transistor liquid crystal displays (TFT displays) is based on the joint perception of light emitted by three subpixels. Each of these subpixels is a source of light with a different wavelength, i.e. colour, and intensity. Not being able to distinguish the visual information of each subpixel individually, the viewer internally merges the subpixels and obtains the impression of a single pixel. The colour of such a pixel is composed of the colours of the three subpixels.

A similar effect occurs not only on the spatial scale, but on the time scale. Entire images of a certain primary colour but with intensity varying over the image plane can be displayed sequentially. On the premise that the primary colour component images are displayed in rapid succession, the brain merges the primary colour component images, thereby forming a single unitary colour image having the intended colour composition. The primary colour component images are also called fields. Display technologies that are based on this effect are known as field sequential colour displays (FSCDs).

A set of primary colour component images of each primary colour used by the specific display composes a frame. In order to generate unitary images, i.e. frames, with the frequency that a display that employs spatially-modulated colour generation is capable of, the frequency of a FSCD has to be scaled by a factor equal to the number of primary colour components used.

While colour reproduction in, for example, common TFT displays necessitates the provision of a transistor for each subpixel, FSCDs of a TFT type can manage on a single transistor for each pixel. In consequence, FSCDs offer a plurality of advantages.

Production costs decrease vastly. Furthermore, display quality can be enhanced. As displays nowadays often comprise more than one million pixels, and thus more than three millions of transistors, it is likely that not every single transistor has been properly manufactured. Damaged subpixels exhibit behaviour such as emitting light not having the desired intensity or even blocking or letting pass background light permanently. Image quality is thereby deteriorated causing permanent user irritation. Reduction of the number of transistors goes along with a reduction of the probability of the presence of a damaged transistor. Moreover, miniaturization of FSCDs can be achieved easily. With the need of only one transistor for each pixel, pixel density can be increased significantly. In consequence, high resolution displays covering a small area can be realised. This is especially beneficial for mobile devices. Having to control merely one transistor per pixel, power consumption of TFT FSCDs is lower than power consumption of displays that employ spatially-modulated colour generation.

In addition, TFT FSCDs allow for a high pixel aperture ratio, i.e. a high ratio between the area of a pixel that is light-transmissive and the pixel area that is opaque because electronic elements, e.g. signal bus wiring, block the light path. A high aperture ratio permits the use of a less powerful backlight source and thus yields decreased energy consumption.

Displays that employ spatially-modulated colour generation often use filters to make the subpixels emit light of a desired primary colour and thus exhibit reduced energy efficiency. Optical filters selectively transmit light having a particular range of wavelengths, i.e. colour of light, while blocking the remainder. The energy of the blocked spectral portion of the incident light does not contribute to image generation and is therefore not of use.

If a FSCD uses a plurality of light sources which emit light having different colours, there is no need for employing filters to obtain different primary colour component images. Hence, energy consumption is reduced. This is not only environmentally sound, but also increases the operating time of battery-powered devices, in particular mobile devices. However, other approaches to primary colour component image generation exist.

The human visual system allows depth perception. Objects can be visually located in the three dimensional space. A viewer's left and right eye perceive slightly different images when looking at an object due to the eyes' horizontal separation. This is called binocular parallax and results in a binocular disparity. The binocular disparity enables the brain to extract depth information from the two images seen by the left and right eye, respectively.

It is obvious that depth perception constitutes a valuable feature of the human visual system. Thus, a variety of devices for both acquiring and reproducing images that enable a viewer to perceive depth have been developed.

The mode of operation of display technologies for application in this field comprises generating two slightly different images, i.e. stereoscopic images with a suitable disparity, intended for a user's first and second eye, respectively. The first eye can be the user's left eye and the second eye can be the user's right eye or the other way round.

To ensure that each of these images actually reaches the eye it is intended for, a plurality of technical approaches exists. A straightforward manner to realise a device having the capabilities described above, is to use two separate display units that are geometrically arranged so that the shown image content of a first display unit is visible for a user's first eye while the content shown on the second display unit is only visible for the user's second eye. A common technology is to integrate the two separate display units in a head-mounted display (HMD) so that a display unit is arranged opposite to each eye. Thus, stereoscopic image reproduction becomes possible by using comparatively simple means.

Due to the advantages set forth above and other advantages, it is desirable to employ FSCDs within the field of stereoscopic image generation.

However, FSCDs suffer from a major drawback. Whenever the eyes of an observer of an image shown by a FSCD move with respect to the image, successive primary colour component images of a frame do not strike the retina at the same location. In consequence, a different set of cones is involved in the visual perception process. Thus, the brain does not merge the primary colour component images properly. As a result, colour breakup artefacts (CBUs) occur. They emerge as rainbow-like areas located at the edges of image objects. For example, an observer is likely to track an object shown on a display by following its movement with his eyes. As the primary colour component images are shown at the same position on the display, CBUs become visible.

Of course, CBUs do not only originate in the movement of the observer's eyes with respect to an image, but also in the movement of the image with respect to the observer's eyes. For example, a rotating public FSCD used for advertising purposes may cause this effect.

CPUs can be avoided by using high image refresh frequencies. Increasing the refresh frequency corresponds to a shorter duration of the period a primary colour component image is shown. Thus, the distance the eye can move within this period is decreased and therefore the observer does not perceive CBUs. Yet, achieving sufficiently high frequencies constitutes a serious technical challenge.

SUMMARY

A method is described which is suitable for controlling a stereoscopic field sequential colour display. The method comprises providing a first primary colour component image for a user's first eye and providing a second primary colour component image for the user's second eye, wherein the first and the second primary colour component images are both provided either at least partially overlapping in time or alternately in uninterrupted succession and wherein the primary colour components of the first and second primary colour component images are different from each other.

Further, an apparatus is described which comprises a controller configured to provide a control signal, wherein the control signal is suitable for controlling a stereoscopic field sequential colour display to provide a first primary colour component image for a user's first eye and to provide a second primary colour component image for the user's second eye, wherein the first and the second primary colour component images are both provided either at least partially overlapping in time or alternately in uninterrupted succession and wherein the primary colour components of the first and second primary colour component images are different from each other.

Further a program is disclosed, comprising program code for performing the method according to the present invention, when said program is executed on a processor. Said program may for instance be distributed via a network, such as for instance the Internet. Said program may for instance be stored on a readable-medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

Moreover, a readable storage medium encoded with instructions that, when executed by a processor, perform the method according to the present invention is disclosed. The readable storage medium may for instance be a computer-readable or processor-readable storage medium. It may be embodied as an electric, magnetic, electro-magnetic, optic or other storage medium, and may either be a removable storage medium or a storage medium that is fixedly installed in an apparatus or device.

In addition a program is disclosed which causes a processor to provide a control signal, wherein the control signal is suitable for controlling a stereoscopic field sequential colour display to provide a first primary colour component image for a user's first eye and to provide a second primary colour component image for the user's second eye, wherein the first and the second primary colour component images are both provided either at least partially overlapping in time or alternately in uninterrupted succession and wherein the primary colour components of the first and second primary colour component images are different from each other.

Further, an apparatus is described that comprises means for providing a control signal, wherein the control signal is suitable for controlling a stereoscopic field sequential colour display to provide a first primary colour component image for a user's first eye and to provide a second primary colour component image for the user's second eye, wherein the first and the second primary colour component images are both provided either at least partially overlapping in time or alternately in uninterrupted succession and wherein the primary colour components of the first and second primary colour component images are different from each other.

The term primary colours subsumes a variety of possible sets of colours. To achieve the effect of field sequential colour generation, at least two primary colour components are needed. Using more than just two primary colours tends to enhance unitary colour image quality.

A common technology employs three primary colour components because the human eye is provided with three kinds of cones. In some cases, these components match the peak sensitivities of the three types of cones of the human retina. In order to overcome the need of generating ideally monochromatic light, it is common to use primary colours that span a narrow wavelength range with its centre located in the spectral vicinity of the peak sensitivity wavelength of the respective cone. Following the naming of the types of cones according to the colour they are particularly sensitive to, the primary colour components are generally referred to as red, green and blue (RGB).

There is no limitation to the characteristics of the primary colour components as long as they are suitable for generating a unitary colour image meeting the requirements of the respective field of application of the stereoscopic FSCD. In consequence, with respect to the present application the term stereoscopic field sequential colour display encompasses every kind of stereoscopic FSCD independently of the concrete set of primary colour components used.

Stereoscopic FSCDs using only red and green as primary colour components are encompassed as well as stereoscopic FSCDs using white, red, green and blue as primary colour components. It is not a precondition for the present invention that any of the colours of red, green or blue forms part of the set of primary colour components. As an example, a set comprising cyan, magenta and yellow may also be employed. It is to be understood that the colours described with respect to the present invention can be realised with slightly different spectral compositions.

FSCD of various kinds exist. The present invention is not limited to a specific kind of FSCD. Moreover, it is not a precondition for the present invention that the stereoscopic FSCD is actually used to display image content that exploits the feature that the FSCD is a stereoscopic FSCD. For example, the content of the images provided for the user's first and the user's second can be the same, i.e. no stereo disparity may be present in the images. A stereoscopic FSCD does only have to be capable of selectively providing images for a user's first eye and the user's second eye.

FSCDs can be projection-based devices or direct-view displays. An advantage of projection-based displays is that they can produce images of variable and often comparably large dimensions. In many cases, changing the image size can be achieved by tuning the optics of a projection based display, e.g. by changing the distance between two lenses. Thus, a projection-based FSCD can meet a user's desire for a versatile display technology. Furthermore, for projection-based displays the size of the displayed image does not automatically determine the physical size the display itself, i.e. the projector. This is of particular interest for mobile devices.

On the other hand, an advantage of direct-view FSCDs is that they are produced in great quantities and are there easily available and often comparatively cheap. In addition, direct-view FSCDs may not require complex optics as is sometimes the case with projection-based displays.

The present invention is not limited to a certain basic technology underlying the FSCD. For example, cathode ray tube (CRT) displays can equally well be used as LCD displays.

Generating light of the respective primary colours can be achieved by different methods. A simple method employs white light that passes through a colour wheel. Such a wheel consists of several filter segments that allow transmission of different colours of light. Rotation of the wheel leads to changing colours of the light that has passed it.

For example, a colour wheel may have a segment that is transmissive to red light, a segment that is transmissive to green light and a segment that is transmissive to blue light. Another colour wheel may have four segments, in particular the red, green and blue segments and a fourth segment that is transmissive to white light, thereby enabling direct use of white light which results in enhanced brightness compared to a method that reconstructs a white light beam from several colour beams that have previously been created by filtering white light.

In an exemplary FSCD, a colour wheel may be positioned between a monochromatic CRT display and an observer. If rotation of the colour wheel and flashing images on the CRT display is properly synchronised, a simple monochromatic CRT display can be turned into an element of a display system capable of showing colour images.

Another exemplary FSCD is a monochromatic LCD having a white backlight source illuminating the pixels. A colour wheel is positioned between the rear side of the LCD panel and the backlight source, thereby creating light of the primary colours needed for generating a full colour unitary image.

An advantage of using a colour wheel for light generation for FSCDs is that a single light source can suffice. This is cost-efficient and requires only little space.

A further exemplary FSCD is also of a LCD type. Instead of a single backlight source, the display is provided with three backlight sources, each emitting light of a different primary colour. For instance, light emitting diodes can serve as backlight sources. An advantage of this approach is that neither a colour wheel nor other optics are needed to generate light having the respective primary colour from the light emitted by a single light source. This tends to make a display more robust and increases energy efficiency as less light is emitted that is not used for image generation, e.g. in comparison to a display using a colour wheel to generate red, green and blue light from white light.

Another exemplary type of FSCD is of a liquid crystal on silicon (LCoS) type. These displays are provided with crystals having orientations that can be changed electrically. A light source arranged in front of the reflective panel illuminates the crystals. In turn, the crystals reflect the incident light to a degree that depends on their orientation. Thus, pixels reflecting light having a desired intensity are provided. The electronics for controlling the pixels can be provided on the rear side of the reflective panel. A FSCD of a LCoS type may alternately illuminate the reflective panel with light of different primary colours. LCoS displays exhibit a high energy efficiency. As the pixels are arranged close to each other without electric components provided between them, the pixels become hard to distinguish for a user, i.e. the screen door effect is mitigated. LCoS displays are not prone to screen burn-in because their mode of operation is based on controlled light reflection. Furthermore, FSCDs of a LCoS type can offer a high resolution while having comparatively small measurements.

Stereoscopic displays can be grouped in two classes. The first class comprises autostereoscopic displays. These displays are characterised by the feature that they can present stereoscopic information a viewer can perceive without the need for special glasses. The second class comprises displays that require special glasses on the part of the user. Autostereoscopic displays are convenient for users. In consequence, they are likely to benefit from good product acceptance.

Some exemplary embodiments of stereoscopic FSCDs that can be used in the scope of the present invention are described in the following. Stereoscopic FSCDs can be based on any of the technologies explained above and other technologies.

A first technology that can be used to generate stereoscopic field sequential colour images employs parallax barrier technology to supply a viewer with two different images for his first and second eye. Displays taking advantage of said technology are autostereoscopic.

For example, a parallax barrier can be provided in form of a mask in front of a TFT display that has three light sources each suitable for emitting light of a different colour, e.g. red, green and blue. Every pixel of the display is associated with an image for a user's first or second eye. Usually, either entire columns or entire rows of pixels or sub-pixels are alternately associated with the first or the second image. In consequence, the resolution of each of the images has only half of the total display resolution.

An observer has to assume a proper viewing position with respect to the display and the mask in order to perceive stereoscopic images. If the viewer is positioned properly, the mask directs light emitted by the pixels associated with the first image to the user's first eye, while it obstructs the path of the light emitted by the pixels associated with the first image to the user's second eye. The same effect is achieved vice versa for the user's second eye. In consequence, two separate images are conveyed to the viewer. With a suitable stereoscopic disparity present in the images, the viewer is enabled to perceive depth.

The mask can be constructed from a layer of liquid crystal. An electric current can be used to easily switch elements of the liquid crystal mask from a transparent to an opaque state. Thus, a stereoscopic FSCD provided with a mask of the above kind can be switched from a monoscopic image generation mode to a stereoscopic image generation mode. In the monoscopic mode, the limitations concerning the image resolution as set forth above are of course suspended.

A second autostereoscopic display technology that is capable of generating stereoscopic field sequential colour images is lenticular lens technology.

To direct the image intended for the first eye to the first eye and the image intended for the second eye to the second eye, an array of lenses is used. They focus the light from different pixels in well-defined directions.

A third exemplary type of autostereoscopic FSCDs employs bidirectional backlight generation. For instance, a monochromatic liquid crystal TFT display can be provided with two backlight sources that can be activated or deactivated alternately.

The two backlight sources may be arranged at different positions at the rear side of the display and may emit white light. Due to their positions and potentially by means of optic elements such as, among many others, mirrors, the light beams, having for example a cone-like shape, originating from the first and the second light source may strike the rear side of the display screen at different angles. As a result the first and the second light cone spread in different directions. Namely, this can allow the first cone to strike a user's first eye and the second cone to strike the user's second eye. Alternately activating the first light source and the second light source and switching between images synchronously causes the user's first and second eye to perceive different images. Thus, it becomes possible to create stereoscopic images.

To illuminate the display with light having different primary colours for field sequential colour generation, a colour wheel can be provided in each optical path of the first and second light beam. Of course the two light sources emitting white light may each be replaced with a plurality of light sources emitting light having the desired primary colours.

A fourth type of stereoscopic field sequential colour displays is not of the autostereoscopic kind. In order to perceive depth, a user has to wear polarizing glasses.

A first primary colour component image having a first direction of polarization for the user's first eye and a second primary colour component image having a second direction of polarization orthogonal to the first direction of polarization for the user's second eye can then be generated.

The polarizing glasses are equipped with a first polarizing filter for the user's first eye and a second polarizing filter for the user's second eye. The polarizing directions of the first and second polarizing filters match the directions of polarization of the first and second primary colour component images, respectively. Thus, the light of the first primary colour component image can pass the first filter and strike on the retina of the user's first eye. However, the light of first primary colour component image cannot pass the second polarizing filter. Vice versa, the light of the second primary colour component image can pass the second but not the first polarizing filter. By means of the polarizing filters, it is ensured that each of the first and second primary colour component images only reaches the eye of the user it is intended for.

A stereoscopic FSCD that requires polarizing glasses on the part of the user may either be of the direct-view or the projection-based type. The first and second primary colour component images may be displayed either overlapping in time or alternately in uninterrupted succession. This is one of the advantages of stereoscopic FSCDs that require polarizing glasses on the part of the user. Furthermore, polarizing glasses can be manufactured at low costs.

A fifth exemplary type of stereoscopic field sequential colour displays uses two separate display units that are geometrically arranged so that the shown image content of a first display unit is visible only for a first eye while the content shown on the second display unit is only visible for a second eye. A common technology is to integrate the two separate display units in a head-mounted display so that a display unit is arranged opposite to each eye. Thus, stereoscopic image reproduction becomes possible by using comparatively simple means.

Such a field sequential head mounted colour display is equally well suitable for generating a first primary colour component image for a user's first eye and a second primary colour component image for the user's second eye overlapping in time or alternately.

The display units can employ any suitable kind of display technology.

A sixth exemplary type of stereoscopic FSCDs requires shutter glasses on the part of a viewer. The shutter glasses alternately obscure the viewer's first and second eye. In synchronization with the alteration of the eye that has an unobstructed view on the display, the image that is shown on it is changed. Thus, separate primary colour component images can be provided for the user's first and the user's second eye, thereby allowing for stereoscopic perception. One method to achieve synchronization of the FSCD and the shutter glasses is to use a joint controller for controlling both the FSCD and the shutter glasses. For example, a personal computer can be equipped with a graphics board having such a controller. Thus, it may not be necessary to replace a FSCD in order to use it for stereoscopic image generation. This is not only cost-efficient, but also environmentally sound.

A seventh exemplary type of autostereoscopic FSCDs can be based on a technology that uses two separate projectors for the primary colour component images for a user's first and second eye. The first primary colour component image generated by a first projector can be directed at a user's first eye by means of suitable optics. Doing the same with respect to the second primary colour component image and the user's second eye, the user is enabled to perceive depth. The optics may comprise a holographic screen similar to the 3-D Real-Time Video Display System manufactured by Physical Optics Corporation, Torrance, Calif., USA.

A stereoscopic FSCD may form part of or be controlled by various electronic devices, for example mobile devices such as handheld game consoles, personal digital assistants (PDAs), mobile phones, remote controls, notebooks, digital music players or global navigation satellite system, e.g. Global Positioning System (GPS), navigation devices. Moreover, a stereoscopic FSCD may be used as a display for a personal computer or as a display for a television set.

An apparatus comprising a stereoscopic FSCD can further comprise a stereoscopic camera. Stereoscopic images taken or video sequences shot by the stereoscopic camera can then be reproduced on the stereoscopic FSCD. A mobile phone provided with a stereoscopic camera and a stereoscopic FSCD is certainly appreciated by consumers.

An advantage of the present invention is that it has the capability of mitigating colour break-up artefacts.

A first primary colour component image for a user's first eye and a second primary colour component image for the user's second eye both provided either at least partially overlapping in time or alternately in uninterrupted succession constitute a pair of primary colour component images.

Partially overlapping in time means that there is at least one point in time at which both images are displayed simultaneously. For example, a primary colour component image for a user's first eye is displayed for 2 ms. After 1 ms a second primary colour component image is provided for the user's second eye and is displayed for 2 ms, too. Thus, the first and the second primary colour component images overlap in time for 1 ms. Of course, images can also overlap in time completely, e.g. both images are displayed for 2 ms and are initially provided at the same point in time.

On the other hand, the first and the second primary colour component images can also be provided alternately in uninterrupted succession. Providing images alternately implies that there is not more than one image provided at a point in time. After the time a first primary colour component image for a user's first eye is shown, a second primary colour component image for the user's second eye is displayed. When the time the second image is displayed has elapsed, a third image, once again for the user's first eye, is shown and so on. The first and the second primary colour component images are provided in uninterrupted succession. The same holds for the second image and the third image. As the second image is provided between the first image and the third image, the first image and the third image are not provided in uninterrupted succession.

The perception of CBUs depends on the primary colours of the image pair. This is due to the fact that human viewers merge primary colour component images provided at least partially overlapping in time or alternately in uninterrupted succession. An image having a colour composed of the two primary colours is the result. Not only the perception of the actual image content but also the perception of the CBUs is subject to this effect. Among other effects, the composed colour of the CBUs controls the degree to which they are perceptible.

For example, a set of primary colours of a stereoscopic FSCD may consist of the colours red, green and blue. If the first and the second primary colour component images both have the primary colour red, an observer will perceive red CBUs as well. Accordingly, both primary colour component images having the primary colour green will cause perception of green CBUs. The same holds for the primary colour blue.

Taking advantage of a method according to the present invention, the first and the second primary colour components are different from each other. For example, a red first primary colour component image and a green second primary colour component image can be provided for a user's first and second eye at least partially overlapping in time. In consequence, within the time of overlap the CPUs appear as image areas having a colour that is composed of the two primary colours. In this exemplary the CBU colour is magenta. Human observers tend to perceive CBUs as less prominent if they do not appear to have one of the primary colours.

Even less prominent artefacts occur if the primary colour components of the first and second primary colour component images are not only different but complementary. When mixed in proper proportion, complementary colours produce neutral colours, i.e. white, grey or black. CBUs having one of these colours are likely not to be noticed by a human observer. For taking advantage of this effect, it is not necessary to use perfectly complementary primary colours. Instead, it may suffice if the colour that is composed of the two primary colours is close to a neutral colour. For instance, if the first primary colour component is green and the second primary colour component is red CBUs can appear yellow which is close to the neutral colour white. Hence, CBUs are mitigated.

In case of primary colour component images for a user's first eye and primary colour component images for a user's second eye being provided at least partially overlapping in time, the present invention is not limited to embodiments that comprise providing the primary colour component images for the user's first eye and the primary colour component images for the user's second eye with the same frequency although this is common for many applications. Primary colour component image provision can also be asynchronous. For example, while three primary colour component images can be provided for the user's first eye, only two primary colour component images can be provided for the user's second eye.

Thus, the first and second primary colour component images are not synchronized with one another. A primary colour component image for a user's first eye may be displayed for a certain period of time. When that period of time has elapsed, another primary colour component image for the first eye having another colour can be displayed. The same can be done with respect to the images provided for a user's second eye. In consequence, in a fixed period of time the number of primary colour component images provided for the first eye may not be equal to the number of primary colour component images provided for the second eye.

In another embodiment of the present invention, at a certain moment there is no primary colour component image provided for at least one eye. An advantage of this exemplary embodiment is that if primary colour component image generation uses, for example, a backlight source, this light source may switched off for a certain period of time. Furthermore, light sources may heat up during operation. Switching them off can prevent overheating, thereby prolonging their durability.

In an exemplary embodiment of the present invention, not providing a primary colour component image for at least one eye serves for maintaining a fixed phase shift, i.e. a fixed delay between the points in time new primary colour component images for a user's first eye are provided and the points in time new primary colour component images are provided for the user's second eye.

For example, not providing a primary colour component image for at least one eye serves for securing provision of new primary colour component images for both eyes at the same time, i.e. with a zero phase shift. For instance, although a first primary colour component image for a user's first eye and a second primary colour component image for the user's second eye can be displayed for different periods of time, image pairs can be provided without a phase shift. If, for example, the first primary colour component image for a user's first eye is displayed for a shorter time than the second primary colour component image for the user's second eye, no image for the first eye can be provided within the time difference. Thus, the moment of initial provision of the first and second primary colour component images of a subsequent image pair can be the same. Hence, a zero phase shift is maintained.

In an embodiment of the present invention a first primary colour component image for a user's first eye and a second primary colour component image for the user's second eye are displayed for the same period of time and without a phase shift. Thus, they overlap completely on a time scale an not only partially. An advantage of this embodiment is that due to the complete overlap, CBUs can be mitigated for the entire time the two images are displayed.

In another exemplary embodiment of the present invention, phase shifted image provision with a phase shift different from zero is used for CBU mitigation. Phase shifted image provision leads to an increased frequency of colour changes of the CBUs. Each time a primary colour component image for either the first or the second eye changes, the colour of the CBUs changes, too. Shorter periods in which the CBUs have a constant colour mitigate the severity of these artefacts for the user.

Namely, if, for example, the durations of the periods each image for the user's first and the user's second eye is displayed are equal and the points in time when new images are provided for the user's first and second eye are shifted by a half period, a change of CBU colour occurs in the middle of these periods. In consequence, the duration of the periods the CBUs exhibit a certain colour is constant and equal for all CBU colours. This can contribute to make CBUs less obvious for the user.

Although the present invention comprises that the primary colour components of a first primary colour component image for a user's first eye and of a second primary colour component image for the user's second eye provided overlapping in time or in uninterrupted succession are different from each other, the present invention is not limited to embodiments adhering to this principle at every point in time. In many cases, for example when using a stereoscopic FSCD for displaying a motion picture, a great many of unitary images have to be provided for a user's first and second eye. Thus, even more primary colour component images have to be generated. Within such a succession of primary colour component images, the primary colours of some pairs of images may not be different.

On the one hand, primary colour component images of a pair which have the same colour may occur intentionally. For example a set of primary colour components may consist of red, green and blue. In a first pair of images the first primary colour component image can be red and the second primary colour component image can be green. In a second pair of images the colour partitioning can be the other way round. Thus, for the first and second image pairs, the primary colours of the primary colour component images are complementary colours and CBUs are especially well mitigated. In consequence, it has been put up with both images of a third pair having the same primary colour for the sake of well mitigated CBUs for the first and second pair.

On the other hand, primary colour component images of a pair which have the same colour may occur unintentionally, for example caused by improper synchronization.

In other embodiments of the present invention, a first primary colour component image for a user's first eye and a second primary colour component image for user's second eye are provided alternately in uninterrupted succession. This is beneficial for stereoscopic FSCDs that are not capable of showing two images at the same time.

By requiring that the primary colours of the first and second primary colour component images are different, CBUs can be mitigated.

For example, not taking advantage of the present invention, the primary colour component of a first primary colour component image for a user's first eye can be red. After the period in which said image is displayed has elapsed, a second primary colour component image for the user's second eye, again with red being the primary colour, is provided. In consequence the perceived CBUs appear red for a period of time as long as the sum of the durations of the periods the first primary colour component image and the second primary colour component images are displayed.

Controlling a stereoscopic FSCD according to an exemplary embodiment of a method of the present invention, the primary colour component of a first primary colour component image for a user's first eye can be red. After the period in which said image is displayed has elapsed, a second primary colour component image for a user's second eye, this time with, for instance, blue being the primary colour, is provided. In consequence, the time the CBUs appear red is shorter than in the case explained above because they change their colour every time a primary colour component image provided for one of the two eyes is changed. Thus, the combined colour of the CBUs in a period of time in which a pair of primary colour component images, i.e. a primary colour component image for each eye, is provided is composed of two different primary colour components and is therefore closer to a neutral colour. Hence, CBUs become less prominent.

In an exemplary embodiment of a method according to the present invention, the set of primary colour components comprises three or more primary colours. In this case, it can be beneficial that every pair of primary colour component images is composed of primary colour component images that have different primary colours. For example, a first primary colour component image for a user's first eye is red, a second primary colour component image for the user's second eye is blue and a third primary colour component image, again for the user's first eye, provided in uninterrupted succession of the second primary colour component image is green. It is thereby ensured that CBUs are mitigated at every point in time for every primary colour component image pair, i.e. the pair consisting of the first and the second primary colour component image and the pair consisting of the second and the third primary colour component image.

In another embodiment of the present invention, the primary colour components of images forming a pair are complementary colours. Thus, the combined colour of the CBUs is especially close to a neutral colour.

Although in some embodiments of the present invention a first primary colour component image for a user's first eye and a second primary colour component image for the user's second eye are provided alternately in uninterrupted succession, there is not necessarily an image provided for one of the eyes at every point in time. This may serve for synchronisation purposes.

In some embodiments of the present invention, the duration the images are provided for a user's first eye and for the user's second eye are different, thereby for example allowing the use of stereoscopic FSCDs that are not capable of providing images for the same duration due to possible technical deficiencies.

Of course, the present invention is also not limited to embodiments that comprises that the primary colours of every pair of primary colour component images provided alternately for a user's first and second eye are different.

Other methods suitable for mitigating CBUs can be employed at the same time. This is possible for image pairs provided at least partially overlapping in time or alternately in uninterrupted succession. For example, two subsequent primary colour component images of the same frame and provided for the same eye of an observer can have different image contents that take into account the movement of the observer's eyes.

These and other aspects of the invention will be apparent from and elucidated with reference to the detailed description presented hereinafter. The features of the present invention and of its exemplary embodiments as presented above are understood to be disclosed also in all possible combinations with each other.

DETAILED DESCRIPTION OF THE FIGURES

Figure 1:
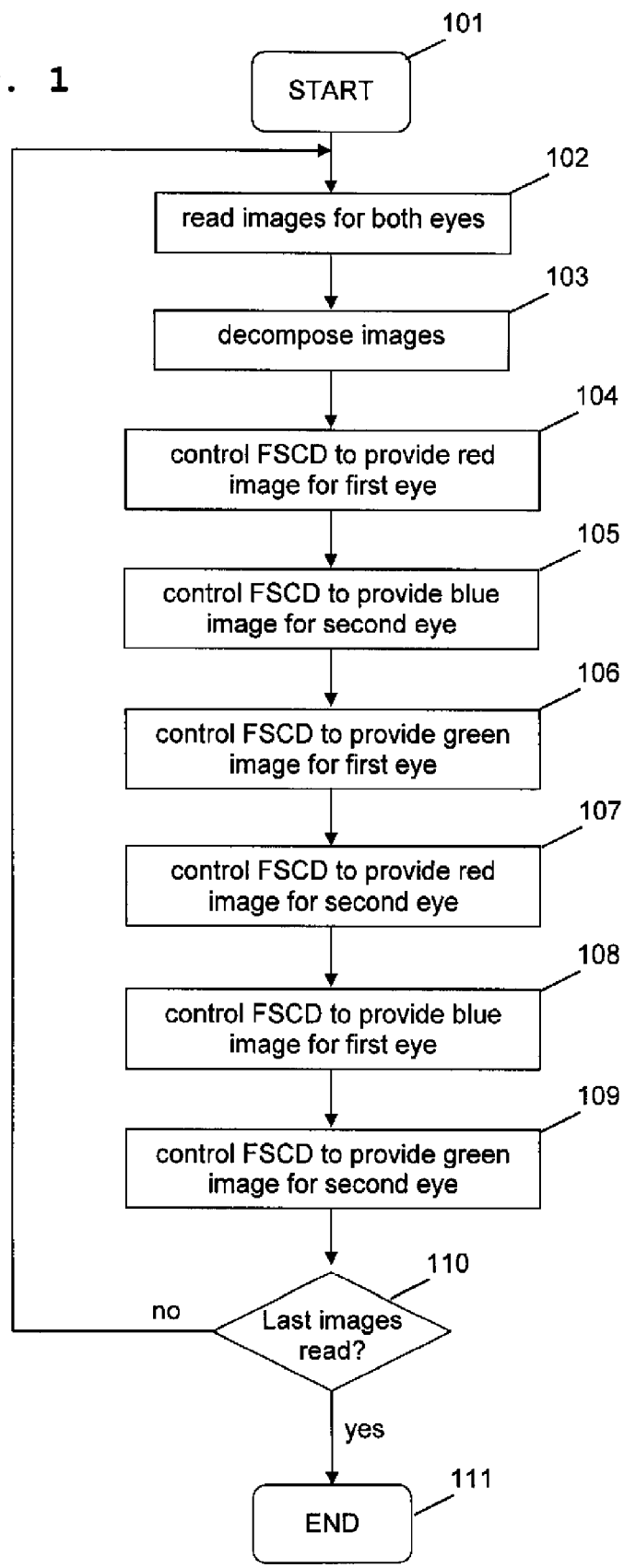
FIG. 1 is a flow chart exemplifying an embodiment of a method according to the present invention.

FIG. 1 is a flow chart exemplifying an embodiment of a method according to the present invention.

Step 101 is the starting point. Step 102 comprises reading image information for both eyes, e.g. from a video file stored on a hard disk. In step 103 a unitary image for a user's first eye and a unitary image for a user's second eye extracted from the video stream are decomposed into primary colour component images. In the present example the set of primary colours comprises red, green and blue. In steps 104 to 109 a stereoscopic FSCD is controlled to provide the primary colour component images for the user's first and second eye alternately in uninterrupted succession. Subsequent images have different primary colours from each other. Having controlled the display to provide the last primary colour component image in step 109, it is checked in step 110 if the last pair of unitary images from the video file has been read.

If this check yields a positive result, the process terminates at step 111. Otherwise, it is returned to step 102 and the next pair of unitary images is read.

Figure 2:
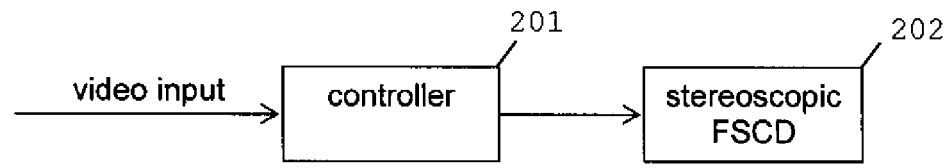
FIG. 2 is a schematic illustration of a first exemplary embodiment of an apparatus according to the present invention.

FIG. 2 is a schematic illustration of a first exemplary embodiment of an apparatus according to the present invention.

The apparatus comprises a controller 201 and a stereoscopic FSCD 202. The controller 201 and the display 202 are connected to each other. Upon receiving video content, the controller 201 provides a control signal suitable for controlling the stereoscopic FSCD 202 to provide a first primary colour component image for a user's first eye and to provide a second primary colour component image for the user's second eye, wherein the first and the second primary colour component images are both provided either at least partially overlapping in time or alternately in uninterrupted succession and wherein the primary colour components of the first and second primary colour component images are different from each other.

Figure 3:
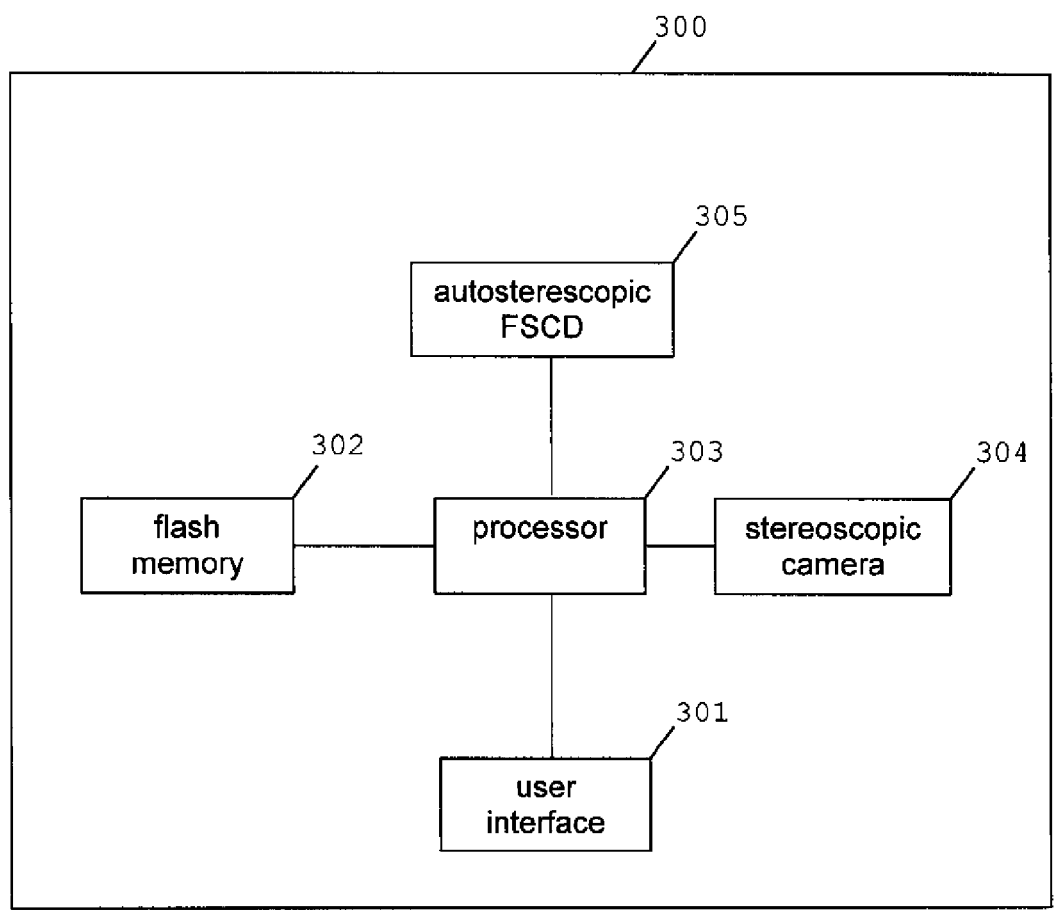
FIG. 3 is a schematic illustration of a second exemplary embodiment of an apparatus according to the present invention.

FIG. 3 is a schematic illustration of a second exemplary embodiment of an apparatus according to the present invention.

The apparatus comprises a mobile phone 300 having a user interface 301, a flash memory 302, a processor 303, a stereoscopic camera 304 and an autostereoscopic FSCD 305. The user interface 301, the flash memory 302, the stereoscopic camera 304 and the autostereoscopic FSCD 305 are each connected to the processor 303.

Flash memory 302 is a computer-readable medium having a computer program stored thereon. The computer program, when executed by processor 303, can generate a control signal for controlling the autostereoscopic FSCD 305 to provide a first primary colour component image for a user's first eye and to provide a second primary colour component image for the users second eye, wherein the first and the second primary colour component images are both provided either at least partially overlapping in time or alternately in uninterrupted succession and wherein the primary colour components of the first and second primary colour component images are different from each other. Hence, flash memory 302 and processor 303 form a controller.

The functions illustrated by the processor 303 executing program code stored on flash memory 302 can be viewed as means for controlling the autostereoscopic FSCD 305 to generate a control signal, wherein the control signal is suitable for controlling a stereoscopic field sequential colour display to provide a first primary colour component image for a user's first eye and to provide a second primary colour component image for a user's second eye, wherein the first and the second primary colour component images are both provided either at least partially overlapping in time or alternately in uninterrupted succession and wherein the primary colour components of the first and second primary colour component images are different from each other.

Furthermore, the program stored on flash memory 302 comprises instructions operable to cause processor 303 to process signals given by a user by means of user interface 301 and to control stereoscopic camera 304. Thus, if the user presses, for example, a certain button of user interface 301, processor 303 can process this command and cause stereoscopic camera 304 to record a stereoscopic video sequence. After that, the stereoscopic video sequence can be displayed on autostereoscopic FSCD 305, wherein the primary colour component images are provided according to a method of the present invention.

Figure 4A:
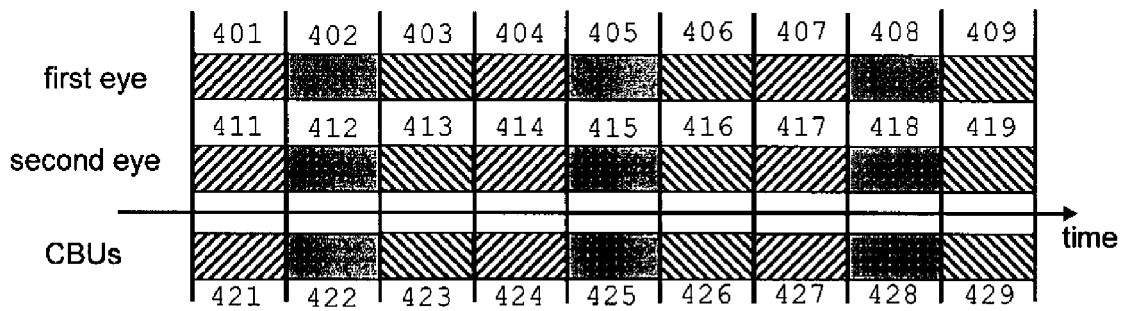
FIG. 4a is a schematic illustration of an exemplary primary colour component sequence with primary colour component images provided completely overlapping in time that can occur if the present invention is not used.

FIG. 4a depicts an exemplary primary colour component sequence that does not take advantage of the present invention.

Primary colour component images for a user's first eye and primary colour component images for the user's second eye are provided completely overlapping in time. The segments 401-409 of the first line illustrate the sequence of primary colour components of the images provided for the user's first eye, while the segments 411-419 of the second line illustrate the sequence of primary colour components of the images provided for the user's second eye. The width of each of the segments 401-419 symbolises the time a primary colour component image of the respective primary colour is displayed for the respective eye of the user. In the third line, the perceived colour of the CBUs and the duration of the periods the CBUs are perceived as having said colour are shown.

In the present exemplary case, three primary colour components are used, namely red (R), green (G) and blue (B). It will be adhered to this set of primary colours in the following examples. However, this is only for the purpose of establishing understanding of the present invention and does not limit the scope of the present invention to this exemplary set of primary colour components.

In FIG. 4a, segments 401, 404, 407, 411, 414, 417, 421, 424 and 427 are associated with the primary colour component red. Segments 402, 405, 408, 412, 415, 418, 422, 425 and 428 are associated with the primary colour component green, while segments 403, 406, 409, 413, 416, 419, 423, 426 and 429 are associated with the primary colour component blue.

Each set of the subsequent primary colour component images that compose a unitary image for one eye form a frame. Thus, segments 401, 402 and 403, for example, symbolise a sequence of primary colour components of one frame. The same holds for the set composed of segments 404, 405 and 406 and for the set composed of the segments 407, 408 and 409. Areas 411 to 419 can be grouped accordingly.

It is to be understood that the sequence of primary colour components within a frame does not have to be constant. Instead, said sequence can change from frame to frame.

A primary colour component image for a user's first eye and a primary colour component image for the user's second eye provided overlapping in time form a pair of primary colour component images that is associated with a pair of primary colour components. For example, segments 401 and 411 constitute a pair of primary colour components.

In the example of FIG. 4a, primary colour component images provided for a user's first and the user's second eye are displayed for periods of equal duration. Moreover, they are provided synchronously, i.e. within a fixed period of time the same number of primary colour component images is provided for both eyes. The phase shift between the primary colour component images provided for the first and second eye is zero. Subsequently, these images overlap in time completely. In the example of a colour sequence not taking advantage of the present invention as depicted in FIG. 4a, both primary colour component images of each pair have the same primary colour. Hence, the CBUs perceived by the user have that colour, too. For instance, because the primary colour of segments 401 and 411 is red, the CBUs also appear red (segment 421).

Figure 4B:
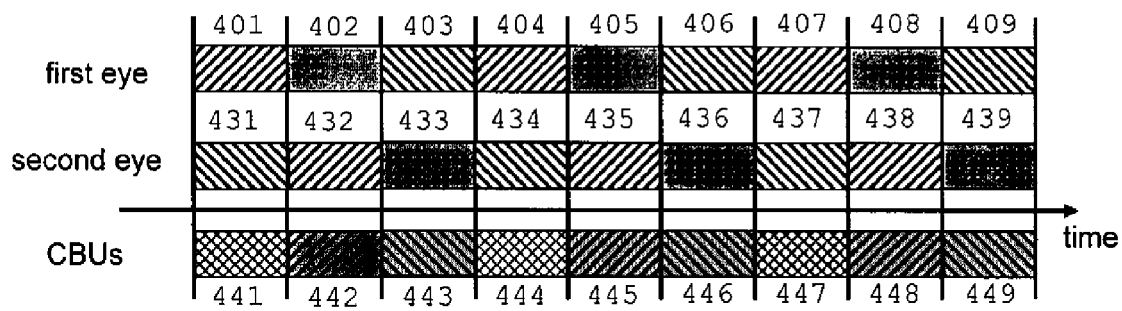
FIG. 4b is a schematic illustration of an exemplary primary colour component sequence with primary colour component images synchronously provided completely overlapping in time without a phase shift according to a first embodiment of the present invention.

FIG. 4b illustrates a first exemplary colour sequence according to the present invention. Again, the primary colour component images for a user's first and second eye are provided synchronously, without a phase shift and they are displayed for periods of equal duration. Thus, they overlap in time completely. However, the colour sequences are not identical. For example, segment 402 is green and segment 432 is red. Red and green are complementary colours. The colour of the CBUs (segment 442) is thus composed of red and green. In this exemplary case, due to the properties of the primary colours red and green employed, the CBUs appear yellow. Yellow is close to the neutral colour white. Hence, the CBUs are less prominent for the viewer. User experience is enhanced. If a primary colour component pair consists of red and blue (segments 401 and 431) the CBUs appear magenta (441), while a pair that consists of blue and green (segments 403 and 433) yields cyan CBUs (segment 443).

Figure 4C:
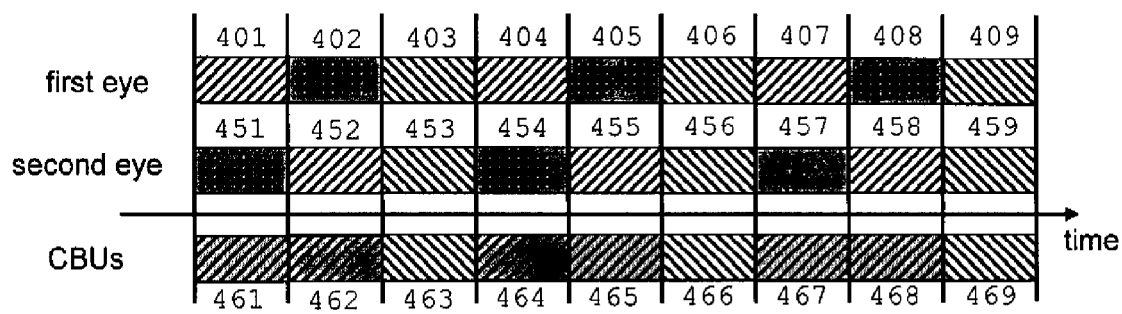
FIG. 4c is a schematic illustration of an exemplary primary colour component sequence with primary colour component images synchronously provided completely overlapping in time without a phase shift according to a second embodiment of the present invention, wherein the primary colours of some pairs of images are not different from each other.

FIG. 4c is a schematic illustration of an exemplary primary colour component sequence with primary colour component images synchronously provided completely overlapping in time without a phase shift according to a second embodiment of the present invention, wherein the primary colours of some pairs of images are not different from each other.

Segment 401 is red and segment 451 is green. Furthermore, the pair of segments 402 and 452 comprises the same colours, although in the first case the primary colour component image provided for a user's first eye is red and the primary colour component image provided for the user's second eye is green and for the pair of segments 402 and 452 the colour distribution is opposite. Thus, the colour of the CBUs (segments 461 and 462) associated with both image pairs is composed of complementary colours. They both appear yellow. Hence, their colour is close to a neutral colour and the user is likely to not perceive them. On the other hand, this goes along with the simultaneous provision of a pair of primary colour component images that are both blue (segments 403 and 453) and blue CBUs (segment 463). Good CBU mitigation for two primary colour component images of a frame is achieved at the cost of suspended CBU mitigation for the third primary colour component image of said frame.

Figure 4D:
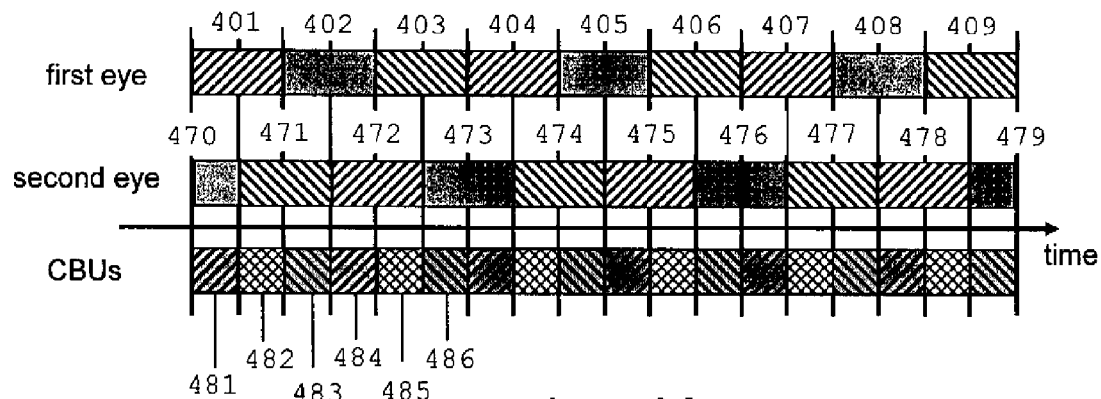
FIG. 4d is a schematic illustration of an exemplary primary colour component sequence with primary colour component images synchronously provided partially overlapping in time with a phase shift that matches half the duration of the period each primary colour component image is displayed according to a third embodiment of the present invention.

FIG. 4d is a schematic illustration of an exemplary primary colour component sequence with primary colour component images synchronously provided partially overlapping in time with a phase shift that matches half the duration of the period each primary colour component image is displayed according to a third embodiment of the present invention.

After a red primary colour component image for a user's first eye (segment 401) has been displayed for already half the overall duration of the period it will be displayed, a new primary colour component image (segment 471) is provided for the second eye. As the colours of segment 471 and its preceding segment 470 are different from each other, the CBUs change their colour, too. In this case, the CBUs first appear yellow (segment 481) and then they appear to be magenta (segment 482). Each time a primary colour component image for either the first or the second eye changes, the colour of the CBUs changes, too. Users tend to perceive mitigated CBUs if their colour changes more frequently.

In the present example, each period the CBUs have a certain colour is equally long due to the half period phase shift. This can also contribute to make CBUs less obvious for the user.

Figure 4E:
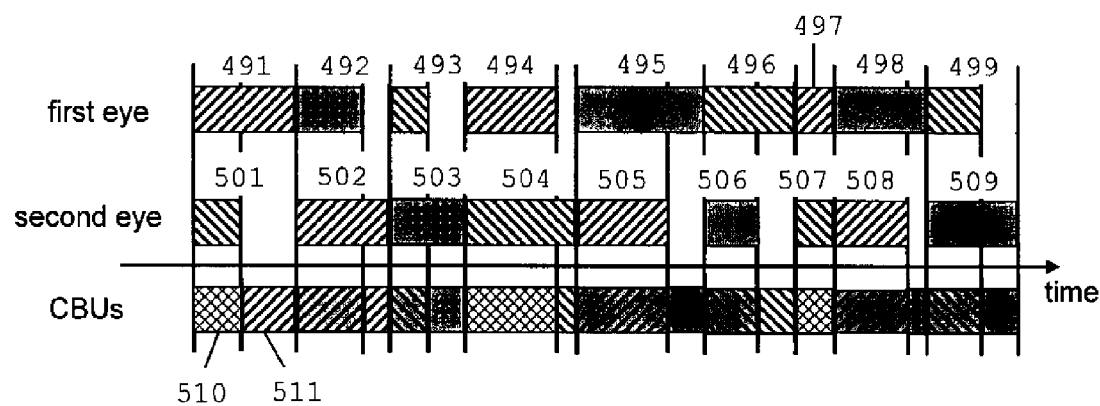
FIG. 4e is a schematic illustration of an exemplary primary colour component sequence with primary colour component images synchronously provided with unequal durations and partially overlapping in time without a phase shift, wherein at certain moments there is no image provided for one eye according to a fourth embodiment of the present invention.

FIG. 4e is a schematic illustration of an exemplary primary colour component sequence with primary colour component images synchronously provided with unequal durations and partially overlapping in time without a phase shift, wherein at certain moments there is no image provided for one eye according to a fourth embodiment of the present invention.

A primary colour component image for a user's first eye (segment 491) is displayed for a certain period of time. When said image is initially displayed, a primary colour component image for the user's second eye (segment 501) is also initially displayed. Thus, there is no phase shift. Displaying the image for the user's second eye (segment 501) ceases before displaying the image for the user first eye (segment 491) ceases. Within the time difference no image is provided for the user's second eye. Hence, the colour of the CBUs changes from segment 510 to segment 511. The colour of the former is composed of the primary colours of segments 491 and 501, while the colour of the latter matches the colour of segment 491. By not providing an image for the user's second eye for the time difference, a fixed phase shift, in this case zero is, maintained. Thus, segments 492 and 502 are initially provided simultaneously. Of course, it is also possible that at certain points no image at all is shown.

Figure 4F:
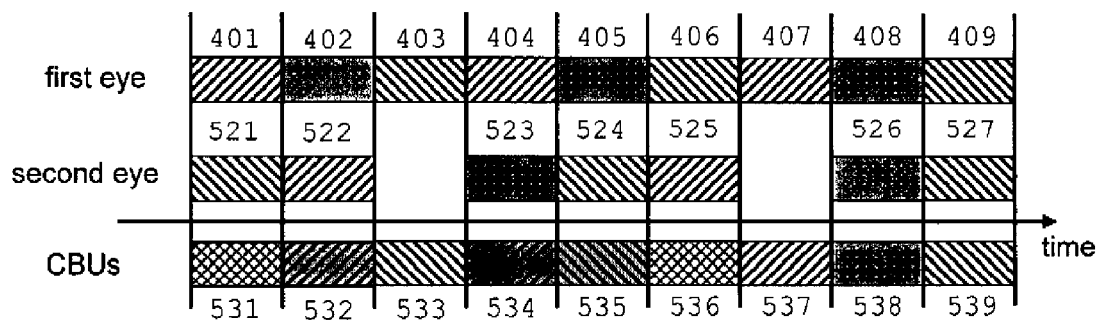
FIG. 4f is a schematic illustration of an exemplary primary colour component sequence with primary colour component images provided asynchronously according to a fifth embodiment of the present invention.

FIG. 4f is a schematic illustration of an exemplary primary colour component sequence with primary colour component images provided asynchronously according to a fifth embodiment of the present invention.

While three primary colour component images are provided for a user's first eye (segments 401, 402 and 403), only two primary colour component images are provided for the user's second eye (segments 521 and 522). In consequence, within a fixed period of time, i.e. within the duration of the period in which the images associated with segments 401, 402 and 403 are displayed, the number of primary colour component images provided for the first eye is not equal to the number of primary colour component images provided for the second eye. Thus, the images for the user's first and second eye are provided asynchronously. The primary colours within the image pair consisting of segments 401 and 521 and within the pair consisting of segments 402 and 522 are different from each other.

Of course, not providing a primary colour component image for the user's first eye for some time can be used in this case to re-establish synchronisation.

Figure 5A:
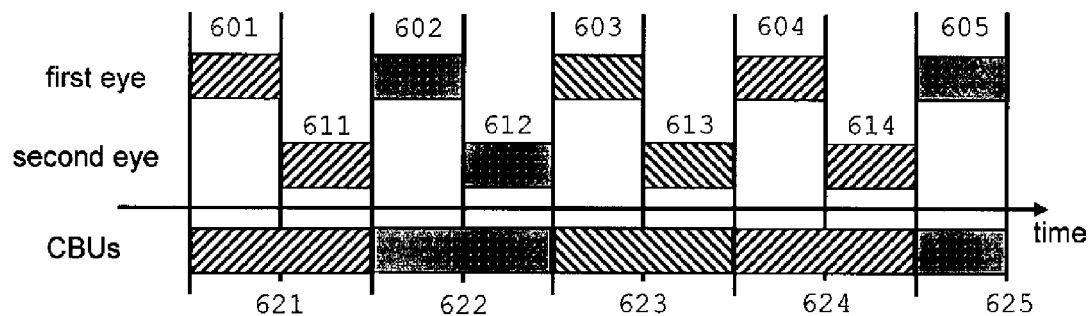
FIG. 5a is a schematic illustration of an exemplary primary colour component sequence with primary colour component images provided alternately in uninterrupted succession that can occur if the present invention is not used.

FIG. 5a is a schematic illustration of an exemplary primary colour component sequence with primary colour component images provided alternately in uninterrupted succession that can occur if the present invention is not used.

Not taking advantage of the present invention, the primary colour component of a first primary colour component image for a user's first eye (segment 601) can be red. After the period in which said image is displayed has elapsed, a second primary colour component image for the user's second eye (segment 611), again with red being the primary colour, is provided. In consequence, the perceived CBUs (segment 621) appear red for a period as long as the sum of the durations of the periods the first primary colour component image (segment 601) and the second primary colour component image (segment 611) are displayed.

Figure 5B:
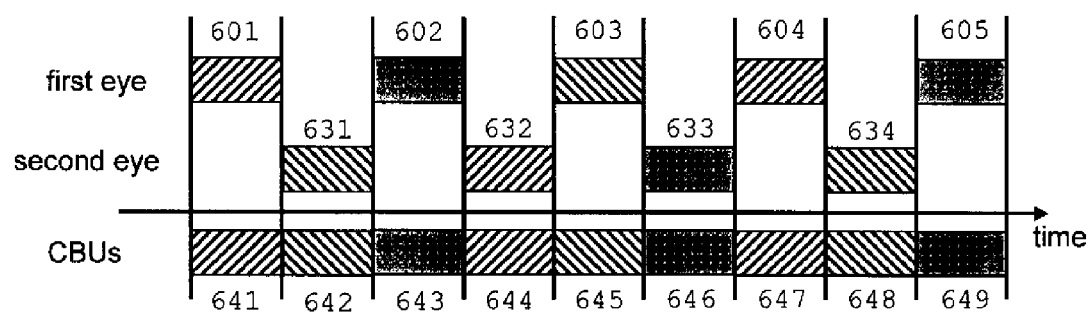
FIG. 5b is a schematic illustration of an exemplary primary colour component sequence with primary colour component images provided alternately in uninterrupted succession according to a sixth embodiment of the present invention.

FIG. 5b is a schematic illustration of an exemplary primary colour component sequence with primary colour component images provided alternately in uninterrupted succession according to a sixth embodiment of the present invention.

In this example, the primary colour component of a first primary colour component image for a user's first eye is red (segment 601). After the period in which said image is displayed has elapsed, a second primary colour component image for the user's second eye having the primary colour blue (segment 631) is provided. In consequence, the time the CBUs appear red (segment 641) is shorter than in the example of FIG. 5a because they change their colour every time a primary colour component image provided for one of the two eyes is changed. Thus, the combined colour of the CBUs in a period of time in which a pair of primary colour component images is provided, e.g. the images associated with segments 601 and 631, is composed of two different primary colour components (segments 641 and 642) and is therefore closer to a neutral colour. Hence, CBUs become less prominent.

In the example of FIG. 5b, every pair of primary colour component images is composed of primary colour component images that have different primary colours. A first primary colour component image for a user's first eye is red (segment 601), a second primary colour component image for the user's second eye is blue (segment 631) and a third primary colour component image (segment 602), again for the user's first eye, provided in uninterrupted succession of the second primary colour component image (segment 631) is green. It is thereby ensured that CBUs are mitigated at every point in time for every primary colour component image pair, i.e. the pair consisting of the first (segment 601) and the second primary colour component image (segment 631) and the pair consisting of the second (segment 631) and the third primary colour component image (segment 602).

Figure 5C:
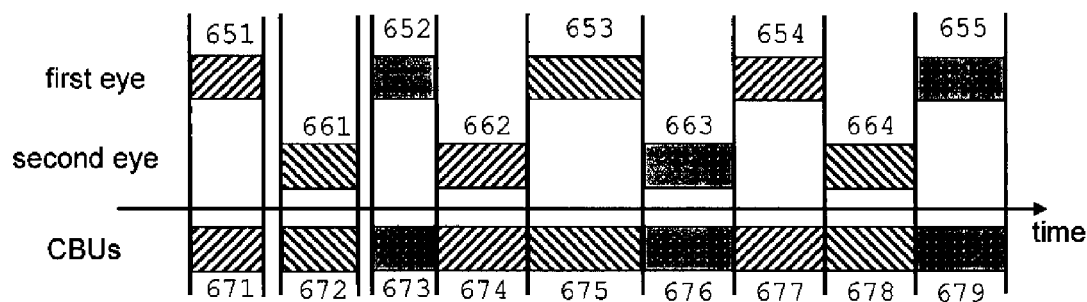
FIG. 5c is a schematic illustration of an exemplary primary colour component sequence with primary colour component images provided alternately in uninterrupted succession with unequal durations, wherein at certain moments there is no image provided for one eye, according to a seventh embodiment of the present invention.

FIG. 5c is a schematic illustration of an exemplary primary colour component sequence with primary colour component images provided alternately in uninterrupted succession and with unequal durations, wherein at certain moments there is no image provided for one eye, according to a seventh embodiment of the present invention.

Although in some embodiments of the present invention a first primary colour component image for a user's first eye and a second primary colour component image for the user's second eye are provided alternately in uninterrupted succession, there is not necessarily an image provided for one of the eyes at every point in time. For example, there is a time lag between the provision of the image associated with segment 651 and the provision of the image associated with segment 661.

In the present exemplary embodiment of a colour sequence according to the present invention, the time for which primary colour component images are displayed is not constant. For instance, the primary colour component image associated with segment 653 is shown for a longer time than the primary colour component image associated with segment 663.

Furthermore, it is readily clear for a skilled person that the logical blocks in the schematic block diagrams as well as the flowchart and algorithm steps presented in the above description may at least partially be implemented in electronic hardware and/or computer software, wherein it depends on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors, application specific integrated circuits, field programmable gate arrays or other programmable devices. The computer software may be stored in a variety of storage media of electric, magnetic, electro-magnetic or optic type and may be read and executed by a processor, such as for instance a microprocessor. To this end, the processor and the storage medium may be coupled to interchange information, or the storage medium may be included in the processor.

What is claimed is:

1. A method comprising:
   providing to a stereoscopic field sequential color display a sequence of pairs of first and second primary color component images, said first primary color component images being for a first eye of a user of said stereoscopic field sequential color display and said second primary color component images being for a second eye of said user of said stereoscopic field sequential color display, said pairs of said first and second primary color component images being provided such that one of the first and second primary color component images in at least one pair completely overlaps the other in time in a stereoscopic video stream for said stereoscopic field sequential color display,
   wherein the first and second primary color component images in said pairs are each composed of only one primary color, and
   wherein, within a sequence of said pairs of said first and second primary color component images, the first and second primary color component images have a different color from one another for at least a portion of the sequence.

2. The method according to claim 1, wherein the primary colors of the first and second primary color component images form part of a set of three primary color components.

3. The method according to claim 1, wherein a color composed of the first and the second primary color component images is substantially a neutral color.

4. The method according to claim 1, wherein the first and second primary color component images comprise complementary colors.

5. The method according to claim 1, wherein the first and second primary color component images are provided asynchronously.

6. The method according to claim 1, wherein the first and second primary color component images are provided synchronously.

7. The method according to claim 1, wherein the first and second primary color component images are displayed for periods of unequal duration.

8. The method according to claim 1, wherein during a time period there is no primary color component image displayed.

9. The method according to claim 1, wherein within a sequence of first and second primary color component image pairs, the first and second primary color component images have the same color.

10. An apparatus comprising:
    one or more processors; and
    one or more memories including computer program code, the one or more memories and the computer program code configured, with the one or more processors, to cause the apparatus to perform the following:
    provide to a stereoscopic field sequential color display a sequence of pairs of first and second primary color component images, said first primary color component images being for a first eye of a user of said stereoscopic field sequential color display and said second primary color component images being for a second eye of said user of said stereoscopic field sequential color display, said pairs of said first and second primary color component images being provided such that one of the first and second primary color component images in at least one pair completely overlaps the other in time in a stereoscopic video stream for said stereoscopic field sequential color display,
    wherein the first and second primary color component images in said pairs are each composed of only one primary color, and
    wherein, within a sequence of said pairs of said first and second primary color component images, the first and second primary color component images have a different color from one another for at least a portion of the sequence.

11. The apparatus according to claim 10, further comprising the stereoscopic field sequential color display.

12. The apparatus according to claim 11, further comprising a stereoscopic camera.

13. The apparatus according to claim 11, wherein the stereoscopic field sequential color display comprises at least one of a color wheel and backlight source.

14. The apparatus according to claim 11, wherein the stereoscopic field sequential color display is an autostereoscopic display.

15. The apparatus according to claim 11, wherein the stereoscopic field sequential color display comprises one of a parallax barrier, lenticular lens, bidirectional backlight source, a holographic screen and two separate display units.

16. The apparatus according to claim 11, wherein the stereoscopic field sequential color display is one of a projection-based display and a direct-view display.

17. The apparatus according to claim 10, forming part of a mobile device.

* * * * *